(12) United States Patent  
Fisher, III

(10) Patent No.: US 7,664,700 B1  
(45) Date of Patent: Feb. 16, 2010

(54) SYSTEM FOR AND METHOD OF INDIVIDUAL ANNUITY PAYOUT ADMINISTRATION

(75) Inventor: Charles Gordon Fisher, III, Scarsdale, NY (US)

(73) Assignee: The Guardian Life Insurance Company of America, New York, NY (US)

( * ) Notice: Subject to any disclaimer, the term of this patent is extended or adjusted under 35 U.S.C. 154(b) by 1224 days.

(21) Appl. No.: 10/054,192

(22) Filed: Jan. 22, 2002

Related U.S. Application Data

(63) Continuation-in-part of application No. 09/625,048, filed on Jul. 25, 2000, now Pat. No. 7,016,871.

(51) Int. Cl.
*G06Q 40/00* (2006.01)

(52) U.S. Cl. .............................. 705/40; 705/35; 705/37; 705/38; 705/36 T; 705/39

(58) Field of Classification Search ........................ None
See application file for complete search history.

(56) References Cited

U.S. PATENT DOCUMENTS

| | | | | |
|---|---|---|---|---|
| 5,761,441 | A | 6/1998 | Bennett | 395/235 |
| 5,893,071 | A * | 4/1999 | Cooperstein | 705/4 |
| 6,275,807 | B1 | 8/2001 | Schirripa | 705/4 |
| 6,324,523 | B1 | 11/2001 | Killeen, Jr. et al. | 705/35 |
| 6,345,261 | B1 | 2/2002 | Feidelson et al. | 705/14 |
| 6,411,939 | B1 | 6/2002 | Parsons | 705/35 |
| 6,611,815 | B1 * | 8/2003 | Lewis et al. | 705/36 R |
| 7,089,201 | B1 * | 8/2006 | Dellinger et al. | 705/35 |
| 2001/0014873 | A1 * | 8/2001 | Henderson et al. | 705/35 |
| 2002/0046110 | A1 | 4/2002 | Gallagher | 705/14 |
| 2004/0177022 | A1 | 9/2004 | Williams et al. | 705/36 |
| 2004/0215493 | A1 | 10/2004 | Koppes et al. | 705/4 |

OTHER PUBLICATIONS

Sondergeld, Eric, T., "Cashing In: The Other Side of Annuities," LIMRA'S Market Facts, Nov./Dec. 1995, vol. 14, Issue 6, pp. 45-48.*

Hargrave, Stanley, E., "An Update and More," Journal Of Financial Planning, Denver, Oct. 1998, vol. 11, Issue 5, pp. 36-38.*

Koco, Linda, "New England Annuities Unit Unveils 4th Generation VA," National Underwriter (Life, Health/Financial Services Ed.), Erlanger, Sep. 25, 1995, vol. 99, Issue 29, pp. 11-13.*

McDonnell Steve, More VAs Introduce Liquidity Options During Annuitization, Annuity Insight Weekly, Apr. 20, 2001, Strategic Insight, www.sionline.com.

(Continued)

*Primary Examiner*—Harish T Dass
*Assistant Examiner*—Benjamin S Fields
(74) *Attorney, Agent, or Firm*—Winston & Strawn LLP

(57) ABSTRACT

A system for and method of administering payouts under an individual annuity contract is provided. In accordance with one embodiment of the present invention, a computer system is provided which includes a memory for storing individual annuity contract data relating to a individual annuity contract which provides the contract owner with the option to withdraw principal from the annuity during the payout phase, and a processor programmed to process and issue principal payouts as selected by the annuitant.

39 Claims, 5 Drawing Sheets

OTHER PUBLICATIONS

Korn, Donald J., Financial Planning, pp. 65-68, Jun. 1, 2000, "Insurance—Signing Bonus: "Credit-enhanced" variable annuities, which give investors a little something extra for signing a contract, are shaking up that industry".

Gruel, Kelly, "Insurance firms rush to offer "bonus" VAs", Fund Marketing Alert, Jan. 11, 1999, vol. 4, Iss. 2, p. 1.

Pizzani, Lori, "Fidelity Drops Surrender Charges", Annuity Market News, Oct. 1, 1999, pp. 1-2.

* cited by examiner

SYSTEM FOR AND METHOD OF INDIVIDUAL ANNUITY PAYOUT ADMINISTRATION

CROSS-REFERENCE TO RELATED APPLICATION

This application is a continuation-in-part of commonly owned U.S. patent application Ser. No. 09/625,048 for "System for and Method of Variable Annuity Contract Administration," filed Jul. 25, 2000 now U.S. Pat. No. 7,016,871, the disclosure of which is incorporated herein by reference as though fully set forth herein.

BACKGROUND OF INVENTION

1. Field of the Invention

The present invention relates to the financial vehicle known as an individual annuity contract. More particularly, the present invention relates to a system for and method of administering payouts under an individual annuity contract.

2. Description of the Prior Art

When an individual retires and no longer collects a salary, he or she needs a way to be able to maintain the same quality of living as he or she enjoyed prior to retirement. Through the purchase of annuity contracts, individuals are provided with an opportunity to meet their retirement needs. As those of ordinary skill in the art know, an annuity is an insurance contract issued by an insurance company where the insurance company makes future payments to the contract owner based on the value at retirement of amounts paid in to the annuity. The contract owner is the person who owns the annuity, while an annuitant is the person on whose life the annuity payments are based. Depending on the payout option chosen, this stream of payments can be for life, for life with a period certain, etc. There are many payout options available with annuities in today's marketplace, as those of ordinary skill in the art will appreciate.

There are two types of individual annuities, fixed and variable. With a fixed annuity, interest will accrue on monies paid in by the contract owner at a rate set by the insurance company during the accumulation phase. The interest earned is guaranteed in the contract for a certain period of time. Taxes are deferred on the accumulated interest and annuity payout options are available. A variable annuity provides benefits that vary directly based on the investment experience of the investment option chosen, such as a particular stock fund. With a variable annuity, the contract owner can make deposits into a variety of mutual fund subaccounts offered through the annuity, defer the taxes on income and gains from these funds, and convert the funds to an income stream for the rest of the contract owner's lifetime. There are fluctuations in the accumulation value of a variable annuity as the investment experience of the investments is passed directly to the contract owner. Because of the many different investment options available, variable annuities are the more popular type of annuity in today's marketplace.

An individual annuity contract has two phases. The first phase is the accumulation phase of the contract. The second phase is the payout phase of the contract. During the payout phase of the contract, the contract owner has the choice of a number of different payout options. The various payout options protect the contract owner from the adverse consequences of living too long and outliving his or her money.

As the individual annuity has evolved and as individual annuities have become more popular in the marketplace, there have been many innovations in this area. For example, various types of death benefits, living benefits, guaranteed minimum income benefits, bonus investment credits for the contract owners at issue, disability benefits, payout options, etc., have been developed. In the current individual annuity contract marketplace, there are many different individual annuity contracts with many different features, and it is expected that there will continue to be many innovations in the individual annuity field and many more additional product features in the future.

In the payout phase, life annuities pay certain amounts of money as long as the insured annuitant survives. For prior art life annuities, after the payout commences, the annuity principal is not available for withdrawal and is not available upon the annuitant's death. To pay out the principal of a life annuity upon death or to make it available for withdrawal would affect the calculated redistribution of these amounts back to surviving annuitants, and would reduce the amount of the payment that an annuitant would receive from the beginning. Thus, the life annuity payout options offered with prior art individual annuity contracts do not allow the annuitant to withdraw principal after payout has commenced.

Liquidity characteristics of different payout options of individual annuities are a feature that is closely examined by prospective contract owners. Typically, people are afraid to tie up their money should an emergency arise, and they desire the ability to access the principal if needed. There are many reasons that an annuity contract owner might need access to the principal, such as serious illness, financial reverses, etc. Due to this lack of liquidity, many owners of annuity contracts never choose a life annuity payout option, as the principal cannot be accessed after payout begins.

Although there are many different types of prior art annuity payout options available in the marketplace with respect to life annuities, there are none that offer the annuitant the option to withdraw principal during the payout phase. The result is that many potential annuity owners avoid life annuity payout options, creating a large untapped market potential.

In view of the foregoing, it is clear that there is a need in the marketplace for an annuity payout option under which the contract owner can withdraw principal from the annuity during the payout phase.

SUMMARY OF THE INVENTION

Accordingly, it is an object of the present invention to provide a system for and method of individual annuity payout administration which overcomes the problems associated with the prior art. It is another object of the present invention to provide a system for and method of individual annuity payout administration for an individual annuity contract with a payout option which enables the contract owner to withdraw principal from the annuity once payout has started. It is yet another object of the present invention to provide a system for and method of individual annuity payout administration for an individual annuity contract with a payout option which enables the contract owner to withdraw principal from the annuity once payout has started and where the payout option meets the retirement needs of the owner.

In accordance with one embodiment of the present invention, a system for administering a payout option of an individual annuity contract is provided comprising a memory for storing data relating to an individual annuity contract of a contract owner, said individual annuity contract having an associated payout option which permits the contract owner to withdraw principal from the annuity during a payout phase of the individual annuity contract; and a processor operatively coupled to the memory configured to calculate and issue a payout in response to a request from the contract owner for a withdrawal of an amount of principal from the annuity.

In accordance with another embodiment of the present invention, a method of administering a payout option of an individual annuity contract is provided comprising the steps of storing data relating to an individual annuity contract of a contract owner in a memory, said individual annuity contract having an associated payout option which permits the contract owner to withdraw principal from the annuity during a payout phase of the individual annuity contract; receiving a request from the contract owner for a withdrawal of an amount of principal from the annuity; and calculating and issuing a payout to the contract owner in response to the request.

The present invention will now be described in greater detail, with frequent reference being made to the drawings identified below in which identical numerals represent identical elements.

DETAILED DESCRIPTION OF THE PREFERRED EMBODIMENT(S)

The following description is presented to enable any person of ordinary skill in the art to practice the present invention. Modifications to the preferred embodiment will be readily apparent to those of ordinary skill in the art, and the disclosure set forth herein may be applied to other embodiments and applications without departing from the spirit and scope of the present invention and appended claims. Thus, the present invention is not intended to be limited to the embodiments described, but is to be accorded the broadest scope consistent with the disclosure set forth herein.

As discussed above, the present invention relates to a system for and method of individual annuity payout administration wherein the individual annuity contract includes a payout option which enables the contract owner to withdraw annuity principal during the annuity payout phase. An exemplary variable annuity contract which provides a payout option which enables principal withdrawal during the payout phase is attached as Appendix A to the parent case, U.S. patent application Ser. No. 09/625,048. An exemplary fixed annuity contract which provides a payout option which enables principal withdrawal during the payout phase is attached hereto as Appendix A. The copyright in the fixed annuity contract attached hereto as Appendix A is owned by The Guardian Life Insurance Company of America and no license is granted herein to make copies of the contract except as an appendix to a United States patent which issues hereon. Those of ordinary skill in the art will appreciate that the present invention is not limited to these particular individual annuity contracts, but may be used in connection with any type of annuity contract, whether fixed or variable.

Figure 1:
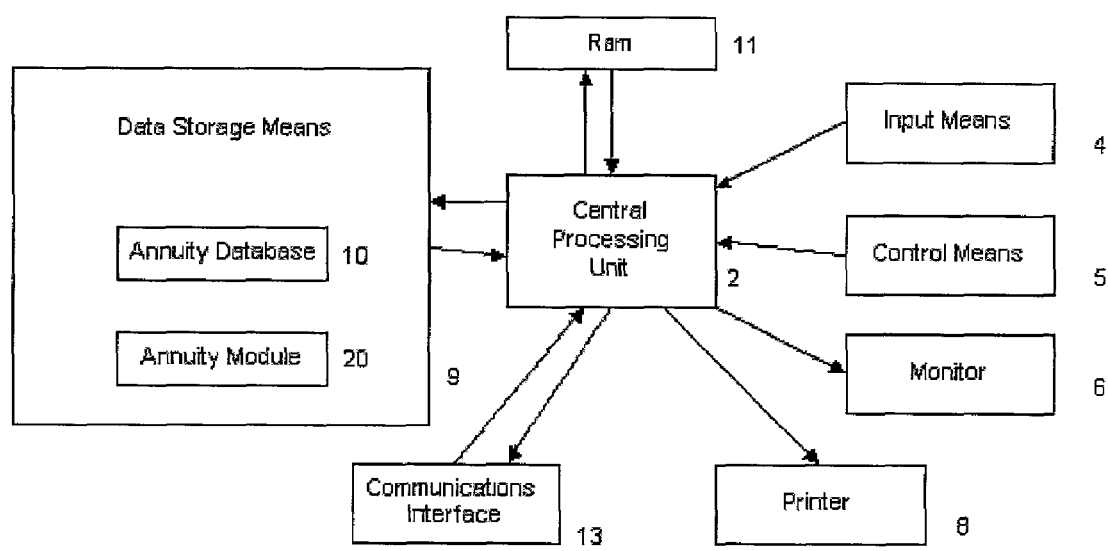
FIG. 1 is a block diagram of a system in accordance with one embodiment of the present invention.

Referring to FIG. 1, a block diagram of a system in accordance with one embodiment of the present invention is shown. The system illustratively includes a central processing unit (CPU) 2 for controlling the operation of the system; input means 4 operatively coupled to the CPU 2, such as a keyboard, floppy drive, tape drive, computer network interface, etc., or any combination thereof, for inputting individual annuity contract data into the system; control means 5, such as a keyboard and/or mouse, for allowing a user to control the operation of the system; a monitor 6 and printer 8 for system output; data storage means 9, such as a hard disk drive or tape drive or other memory means, operatively coupled to the input means 4 and CPU 2, said data storage means 9 including an Annuity Database 10 for storing data relating to each individual annuity contract administered by the system, including but not limited to, the name of the contract owner, the date of birth of the contract owner, the sex of the contract owner, the address of the contract owner, the contract purchase date and amount, the amount of premium paid by the contract owner and the dates of payment thereof, the beneficiary named in the contract, the associated withdrawal charge percentages, the payout option selected by the contract owner including the annuitization date, and data relating to any events associated with each contract, such as data relating to any withdrawal made by a contract owner. If variable contracts are being handled, the Annuity Database 10 will also store additional data relating to each variable annuity contract administered by the system, including but not limited to, the associated bonus investment credit percentage, the associated asset-based commission percentage, the selected mutual fund allocations of the annuity, the number of fund units for each mutual fund, and whether a rider is chosen and what the terms of the rider are. The data storage means 9 further includes an Annuity Module 20 which includes instructions to be executed by the CPU 2 for administering annuity contracts based on data stored in the Annuity Database 10. Referring again to FIG. 1, the system further includes a random-access-memory 11 ("RAM"), which may be used in addition to or in combination with the data storage means 9 to store contract data as well as other dynamic data; and a communications interface 13, such as a modem or network card, which can be used to communicate with other computers and computer networks.

In practice, the system will typically take the form of a personal computer running MS-DOS or Windows, but may take the form of a Unix workstation, a mainframe computer, a mid-range computer, or any other apparatus that can be configured to perform the functions described herein. The software described herein, including the Annuity Module 20, may be written in any programming language that is compatible with the system.

Figure 2:
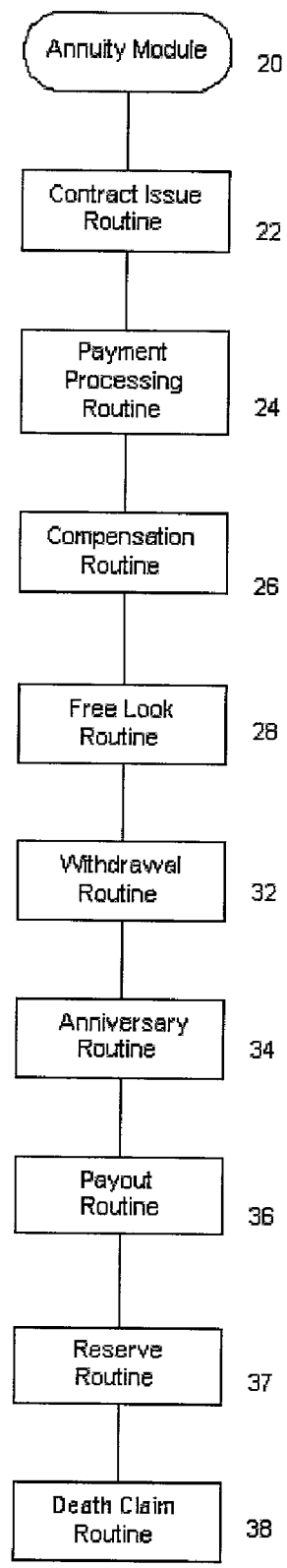
FIG. 2 is a block diagram of an Annuity Module in accordance with one embodiment of the present invention.

Referring to FIG. 2, a block diagram of the Annuity Module 20 is provided. The Annuity Module 20 includes a Contract Issue Routine 22 which is used to issue new annuity contracts; a Payment Processing Routine 24 which is used to process premium payments; a Compensation Routine 26 which is used to calculate commission payments to distributors; a Free Look Routine 28 which is used to process contract returns; a Withdrawal Routine 32 which is used to calculate withdrawal charges when money is withdrawn from an annuity by a contract owner; an Anniversary Routine 34 which is used to calculate annual account fees; a Payout Routine 36 which is used to calculate and make annuity payments once the contract is annuitized; a Reserve Routine 37 which is used to calculate reserves; and a Death Claim Routine 38 which is used to calculate the death benefit and pay the beneficiary when the annuitant dies. The present invention focuses primarily on the Payout Routine 36 and the Reserve Routine 37. A detailed discussion of the operation of the other routines of the Annuity Module 20 is provided in the parent case, commonly owned U.S. patent application Ser. No. 09/625,048 which is incorporated herein by reference.

Figure 3:
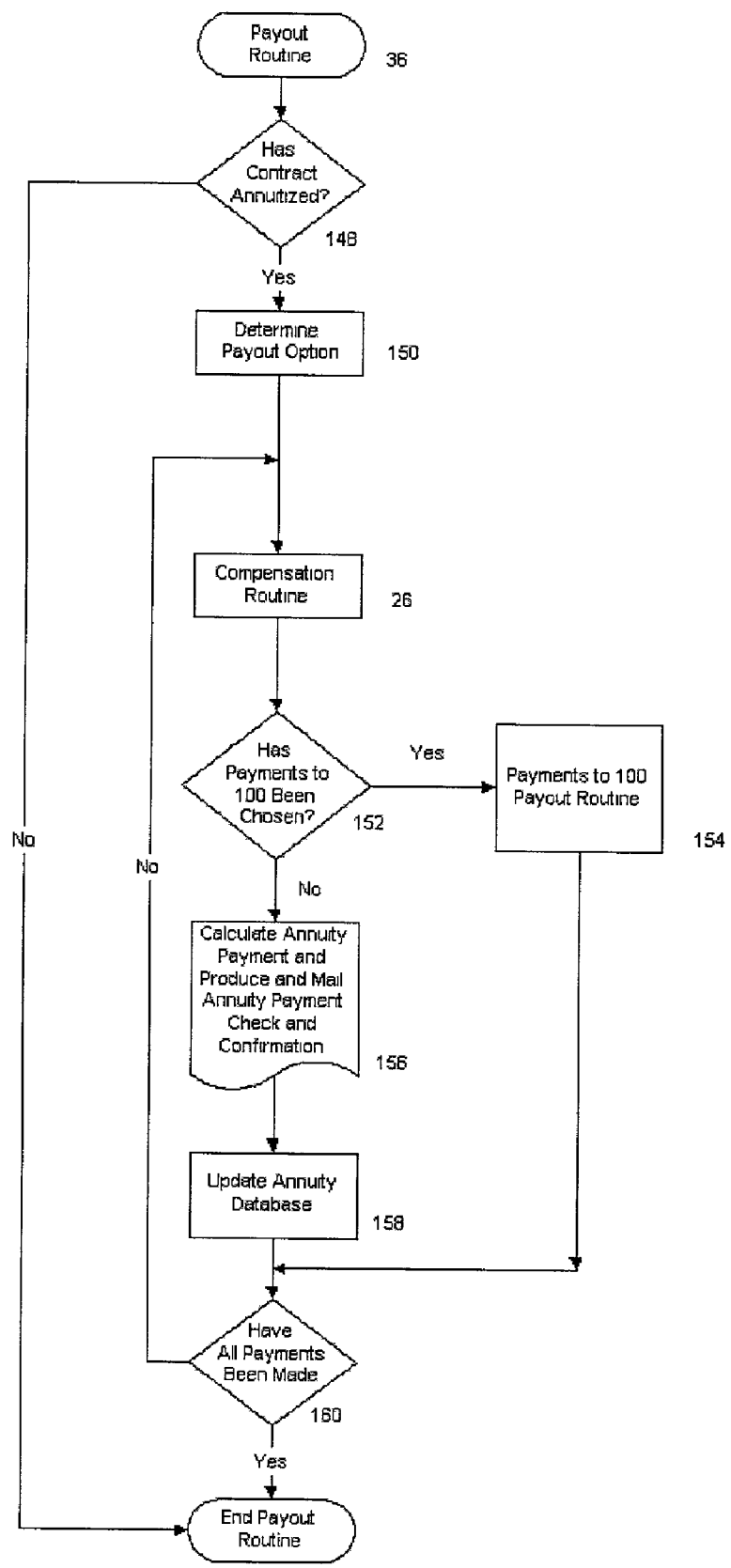
FIG. 3 is a flow chart illustrating the operation of a Payout Routine in accordance with one embodiment of the present invention.

Referring to FIG. 3, a flow chart of the Payout Routine 36, which is used to process payout options during the payout phase, is provided. The first step in the Payout Routine 36 is to determine whether the contract has annuitized by checking the Annuity Database 10 (step 148), which includes checking the current date against the annuitization date. If the contract has not annuitized, then the Payout Routine 36 is terminated. Payouts only occur if the contract has annuitized. If the contract has annuitized, then the payout option selected by the contract owner is determined from the Annuity Database 10 (step 150).

In a preferred embodiment, the payout options available to the annuitant are: (1) a life annuity without a guaranteed payout period, (2) a life annuity with a 10 year guaranteed payout period, (3) an option where payments are made until age 100, and (4) a joint and survivor option that will make reduced payments to the survivor. However, any number of different payout options could be made available to the annuitant.

In accordance with a preferred embodiment of the present invention, the payout option where payments are made until age 100 permits principal withdrawals to be made once the contract has annuitized, while at the same time allowing the contract owner to receive payments for a period of time to meet his/her retirement needs. Under the payments until age 100 payout option, payments will cease once the annuitant has reached age 100. Those of ordinary skill in the art will appreciate, however, that the payout option of payments until age 100 is not necessarily limited to just age 100, but can be a payout option of payments to contract owners until any age which is chosen by the insurance company.

Compensation can also be paid to contract distributors for as long as annuity payments are being made. The Compensation Routine 26 will process these compensation payments.

The next step in the Payout Routine 36 is to determine whether the Payments to 100 Payout option has been chosen (step 152). If the Payments to 100 Payout option has not been selected, the payment amount based on the selected payout option is then calculated and a check and confirmation statement are generated and mailed to the annuitant (step 156) and the Annuity Database is updated (step 158). For payout options other than the Payments to 100 Payout option, once the contract has annuitized, the contract may not be surrendered and a partial withdrawal may not be made. This is because annuity payments are calculated based on the payments being made until the annuitant dies or lives to the guaranteed payment payout date. To pay out the principal of a life annuity upon death or to make it available for withdrawal would affect the calculated redistribution of these amounts back to surviving annuitants, and would reduce the amount of the payment that an annuitant would receive from the beginning. This is the reason that prior art life annuities do not allow the annuitant to withdraw principal after payout has commenced. The payout routine will continue in this manner until all payments have been made (step 160).

If the Payments to 100 Payout option is chosen, an option to surrender the contract or to make a partial withdrawal of the principal is provided to the contract owner. Surrendering a contract means returning the contract to the insurance company and having the surrender value of the contract paid out, at which point the contract will terminate. The Payments to 100 Payout Routine 154 processes the payouts under this payout option.

Figure 4:
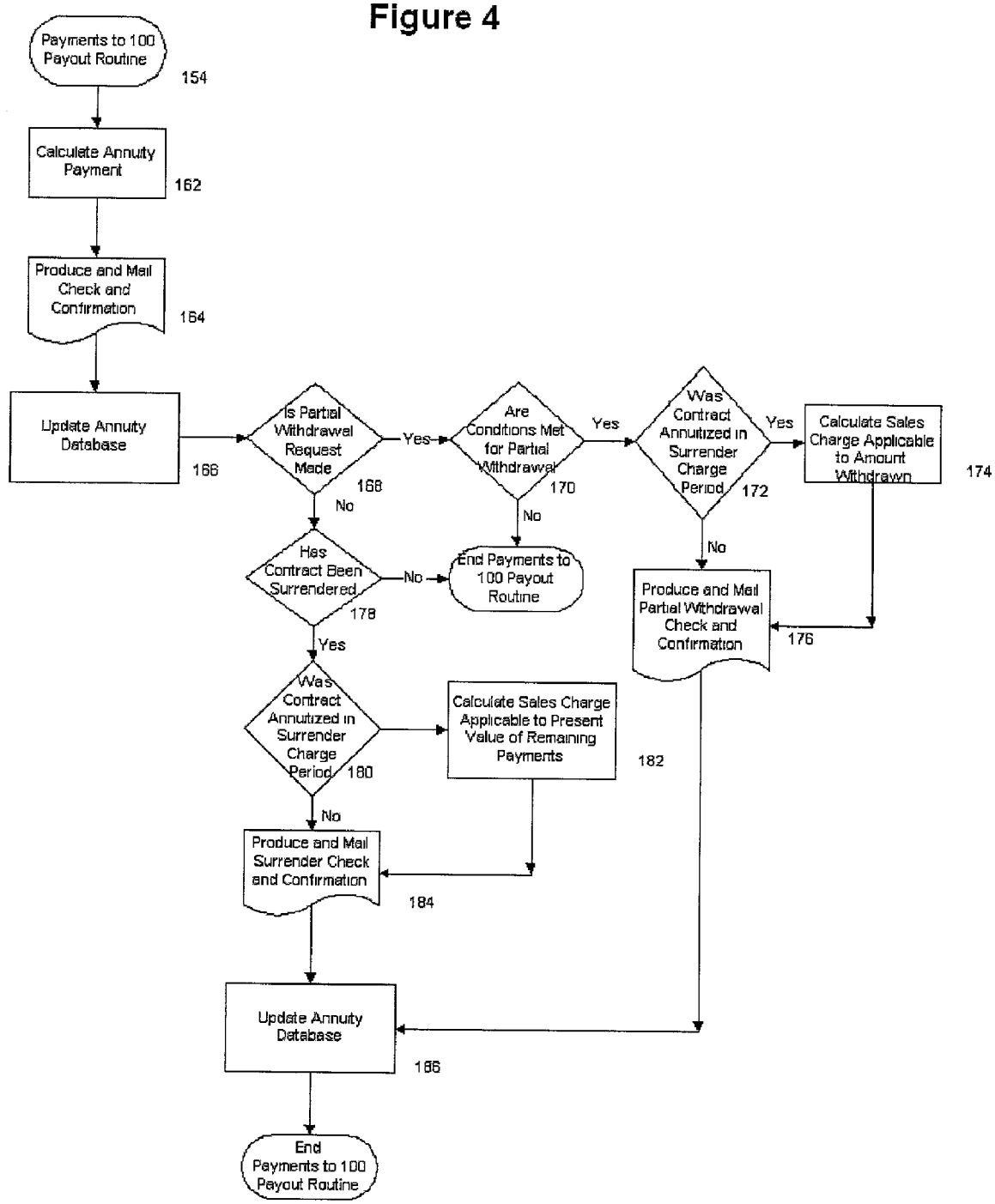
FIG. 4 is a flow chart illustrating the operation of a Payments to 100 Payout Routine in accordance with one embodiment of the present invention.

Referring to FIG. 4, a flow chart of the Payments to 100 Payout Routine 154 is provided. As a first step, the annuity payment is calculated (step 162). Under the Payments to 100 Payout option, annuity payments will be made until the annuitant reaches age 100. If the annuitant were to live past 100, annuity payments would cease. The number of annual payments under the Payments to 100 option is equal to 100 minus the annuitant's age on the annuitization date (hereinafter referred to as "n").

Payments in a variable annuity and a fixed annuity are made to the contract owner as a constant number of units with the value of the units varying at each payment date. At the annuity commencement date, the total amount annuitized is multiplied by an annuity factor. The annuity factor is determined by the mortality table that is stated in the contract, the age of the annuitant, and the amount that is being annuitized. For example, the annuity factor can be the dollar amount of the annuity payment purchased with each $1,000 of proceeds applied. This result is then divided by the unit value to determine the number of units that are payable in each payment. At each payment date, the units payable are multiplied by the unit value (as determined by the value of the funds which comprise the annuity) at that time to determine the amount of the payment. The interest rate used is the assumed investment return (AIR), which is chosen by the contract owner when the contract is annuitized. The preferred interest rate choices for the variable annuity contract are 0%, 3.5%, or 5%. The preferred interest rate choice for the fixed annuity contract is 3%. However, any AIR may be used in accordance with the present invention. The following formula is used to calculate the number of units that will be paid on each payment date when the AIR is not 0%:

$$\text{Units Paid} = (\text{Amount Annuitized}) * \frac{\text{Annuity Factor}}{\text{Unit Value}} \quad \text{(EQ. 1)}$$

The annuity factor is equal to:

$$\frac{1}{((1-v^n)/d)} \quad \text{(EQ. 2)}$$

where $v=1/(1+I_o)$, $I_o=\text{AIR}$ and $d=I_o v$

When the AIR is 0%, the number of units paid at the time of annuitization is calculated differently. The amount annuitized is divided by the number of payments that will be paid from the time of annuitization until age 100. This result is then divided by the unit value at the time of annuitization. The resulting value is the number of units that will be paid on each payment date. The following formula is used to calculate the number of units that will be paid on each payment date when the AIR is 0%.

$$\text{Units Paid} = \frac{((\text{Amount Annuitized})/\text{Total Number of Payments})}{\text{Unit Value}} \quad \text{(EQ. 1a)}$$

Once the annuity payment has been calculated, a check is produced and mailed to the annuitant (step 164). The Annuity Database 10 is then updated (step 166).

If the contract owner requests a partial withdrawal of the annuity principal (step 168), the first step is to determine whether the request meets the conditions for a partial withdrawal (step 170). The conditions for a partial withdrawal in accordance with a preferred embodiment of the present invention are as follows:

the annuitant may not withdraw less than $500;
the present value of the remaining payments must be at least $2,000;
the remaining monthly payment is at least $20 (or $60 quarterly, $120 semi-annually, or $240 annually); and
one partial withdrawal is permitted each quarter without charge and additional withdrawals are permitted at a charge not to exceed the lesser of $25 or 2% of the amount withdrawn.

Those of ordinary skill in the art will appreciate that the present invention is not limited to the foregoing conditions. The conditions imposed on the contract owner will be based on actuarial calculations performed by the insurance company which issues the contract.

If the imposed conditions are met, the next step is to determine whether the contract was annuitized during the surrender charge period (step 172). The surrender charge period is the period in which a charge is assessed if any amount is withdrawn or surrendered. In most contracts, the charge is assessed as a percentage of the amount withdrawn or surrendered. If the contract was annuitized during the surrender charge period, then, in accordance with a preferred embodiment, the surrender charges were initially waived. The present value of the percentage of the remaining payments that will be made will be reduced by the portion of the charge that was waived if the withdrawal is made during the surrender charge period of the contract, which will allow the recovery of the surrender charges that had been previously waived when the contract annuitized. The amount of this reduction is calculated as follows (step 174):

$$\text{Reduction} = \frac{\text{(Amount waived)} \times \text{(\% withdrawn)} \times \text{(number of payments not yet paid until the surrender charge of the contract in the deferred phase would have expired)}}{\text{Total number of payments to be paid at time of annuitization until the surrender charge of the contract in the deferred phase would have expired}} \quad \text{(EQ. 3)}$$

The next step is to calculate the present value of the remaining payments. The present value of remaining payments is the present value of the stream of future annuity payments. For the purpose of the following formula, it is assumed that payments will be made on an annual basis:

$$\text{Present value} = \text{(percentage of annual payments to be withdrawn)} \times \text{(annual payment)} \times ((1-v^n)/d) \quad \text{(EQ. 4)}$$

where $v=1/(1+I_o)$, $I_o=\text{AIR}$ and $d=I_o v$

A check for the partial withdrawal and a confirmation statement are then produced and mailed out (step 176), and the Annuity Database 10 is updated (step 186). If the conditions for a partial withdrawal have not been met, a partial withdrawal is not permitted and the Payments to 100 Payout Routine 154 is terminated.

If a partial withdrawal request is not made, the Payments to 100 Payout Routine 154 will check to see if the contract owner is requesting to surrender the contract (step 178). If the contract is being surrendered, the next step is to determine whether the contract was annuitized during the surrender charge period (step 180). As indicated above, if the contract was annuitized during the surrender charge period, then, in a preferred embodiment, the surrender charges were initially waived. The present value of the percentage of the remaining payments that will not be made will be reduced by the portion of the charge that was waived. The amount of this reduction is calculated as follows (step 182):

$$\text{Reduction} = \frac{\text{(Amount waived)} \times \text{(\% withdrawn)} \times \text{(number of payments not yet paid until the surrender charge of the contract in the deferred phase would have expired)}}{\text{Total number of payments to be paid at time of annuitization until the surrender charge of the contract in the deferred phase would have expired}} \quad \text{(EQ. 5)}$$

The next step is to calculate the present value of the remaining payments. For the purpose of the following formula, it is assumed that payments will be made on an annual basis:

$$\text{Present value} = \text{(annual payment)} \times ((1-v^n)/d) \quad \text{(EQ. 6)}$$

where $v=1/(1+I_o)$, $I_o=\text{AIR}$ and $d=I_o v$

A surrender check and a confirmation statement are then produced and mailed out (step 184), and the Annuity Database 10 is updated (step 186). If a request to surrender the contract has not been made, the Payments to 100 Payout Routine 154 is terminated.

Figure 5:
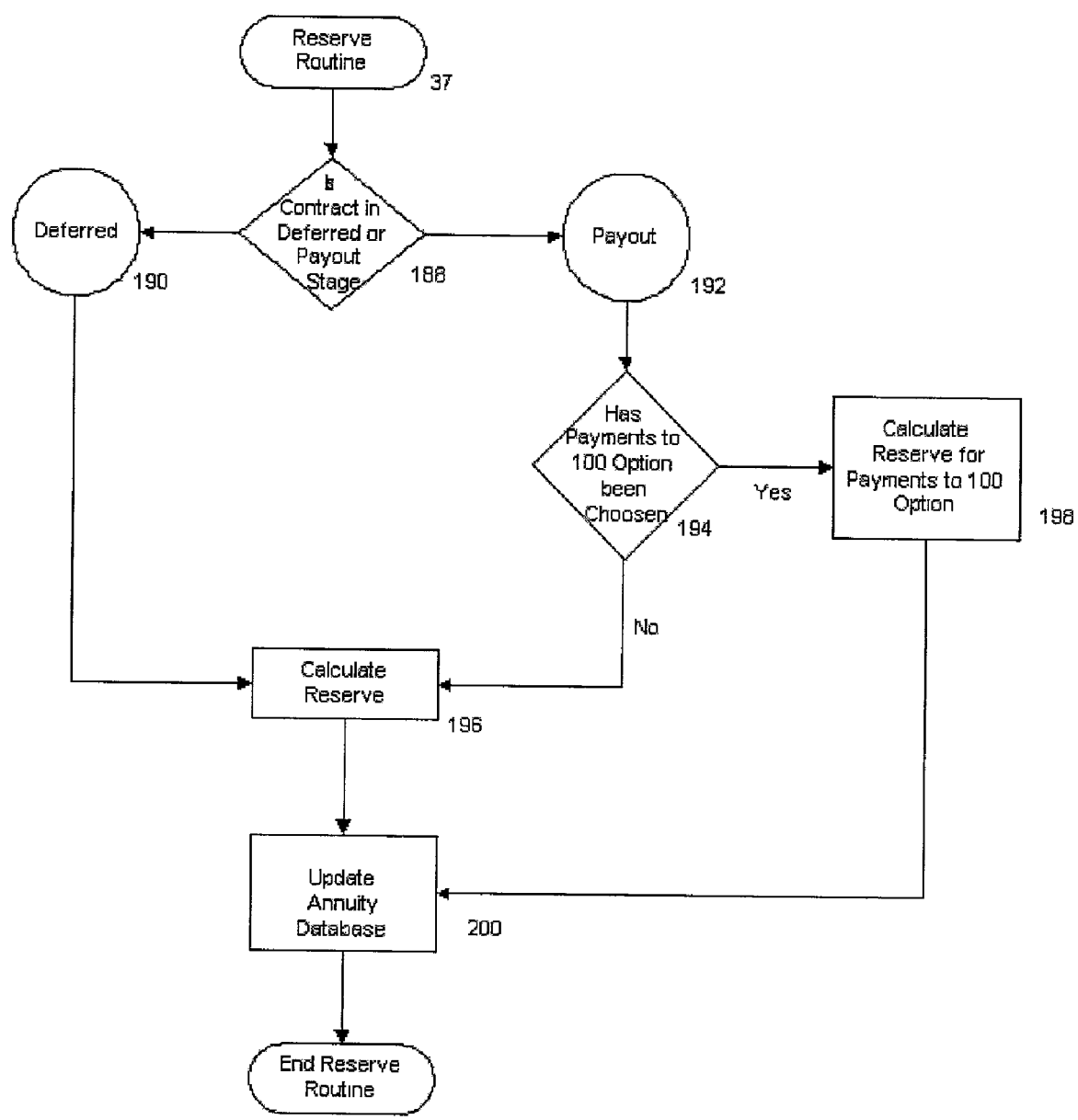
FIG. 5 is a flow chart illustrating the operation of a Reserve Routine in accordance with one embodiment of the present invention.

While the contract is in force, reserves have to be calculated. Reserves are the amount of money that the insurance company puts aside to pay future claims. It is an actual amount that is shown on the annual statement of the insurance company and is required by law to be calculated. The Reserve Routine 37 of the Annuity Module 20 is used to calculate the reserves. A flow chart of the Reserve Routine 37 is provided in FIG. 5. The first step in the Reserve Routine is to determine whether the contract is in the deferred phase, which is also known as the accumulation phase, or in the payout phase (step 188). If the contract is in the deferred phase (step 190), the reserve is calculated in accordance with state laws and regulations (step 196) and the Annuity Database is updated (step 200) and the Reserve Routine 37 is terminated. If the contract is in the payout phase (step 192), it is necessary to determine whether the Payments to 100 Payout option has been chosen (step 194). If the Payments to 100 Payout option has not been chosen, the reserve is calculated (step 196), the Annuity Database 10 is updated (step 200) and the Reserve Routine 37 is terminated. If the Payments to 100 Payout option has been chosen, it is then necessary to calculate the reserve when payment is made or money is withdrawn (step 198). The reserve is calculated as follows:

$$\text{Reserve} = \text{Payment} * ((1-v^x)/d) \quad \text{(EQ. 7)}$$

where $v=1/(1+I_o)$, $I_o=\text{AIR}$, $d=I_o v$ and x=number of payments remaining This value is then discounted, at an interest rate equal to the AIR, to the end of the year. Once the reserve is calculated for the Payments to 100 Payout option, the Annuity Database 10 is updated (step 200) and the Reserve Routine 37 is terminated.

Thus, in accordance with the foregoing the objects of the present invention are achieved. Modifications to the above would be obvious to those of ordinary skill in the art, but would not bring the invention so modified beyond the scope of the appended claims.

I claim:

1. A system for administering a payout option of an individual annuity contract of a contract owner, wherein said individual annuity contract is a variable annuity contract or a fixed annuity contract, said system comprising:
   a memory including data relating to said individual annuity contract stored therein, said data including an associated payout option which permits the contract owner of said individual annuity contract to request and withdraw from the annuity during a payout phase of the individual annuity contract;
   a processor operatively coupled to said memory configured to read the associated payout option, to provide that option to a system user, and to calculate and issue a payout in response to a request from said contract owner for a surrender of said annuity; and
   wherein the system is configured to provide to the user during a payout phase a selectable option with which the user interacts to surrender the annuity to obtain a payout of principal in its entirety for surrendering the annuity contract during the payout phase;
   wherein the surrender amount corresponds to a value of the annuity that is a present value of the stream of future annuity payments under the annuity contract.

2. The system of claim 1 wherein the option further includes providing the user with the ability to withdraw a portion of a present value of the annuity contract during the payout phase.

3. The system of claim 1 wherein the annuity contract has a payout phase specified to a certain age.

4. The system of claim 1 wherein said processor is further configured to calculate a withdrawal charge and deduct said withdrawal charge from said payout.

5. A method of administering a payout option of an individual annuity contract of a contract owner, wherein said individual annuity contract is a variable annuity contract or a fixed annuity contract, said method comprising the steps: storing data relating to said individual annuity contract in a memory, said data including an associated payout option which permits the contract owner of said individual annuity contract to request and withdraw an amount from the annuity during a payout phase of the individual annuity contract; after entry into the payment phase, receiving a request from said contract owner for a withdrawal of the amount from said annuity at a processor coupled to the memory; using the processor to calculate a payout to said contract owner in response to said request when the processor determines that scheduled payments under the payout phase will not be reduced below a minimum value for remaining payments under the payout phase; providing an option to a user to interact with the processor to select surrender of the annuity contract during the payment phase, to obtain a payout of principal in its entirety wherein the value of the surrender amount of the annuity corresponds to a prorated value of the stream of future annuity payments under the annuity contract; issuing said payout to said contract owner; and terminating said annuity contract.

6. The method of claim 5 wherein the amount withdrawn is a portion of the current value of the annuity.

7. The method of claim 5 wherein the amount withdrawn surrenders the annuity contract.

8. The method of claim 5 comprising the further steps of calculating a withdrawal charge and deducting said withdrawal charge from said payout.

9. The method of claim 5, wherein the payout amount comprises the entire principal amount.

10. A system for administering an annuity contract comprising: a database provides storage to information related to the annuity contract, the information including a payout option and an annuitization date, wherein a computer is configured to determine whether the contract has annuitized based on the annuitization date; access the database to determine the payout option; calculate an annuity payment based on the payout option, wherein the payout option is an option where payments are made to a predetermined age; determine entry into a payout phase after the annuitization date; after entry into the payment phase, calculate one of a partial withdrawal amount or a surrender amount for a payout of principal in its entirety based on information in the database, wherein the value of the annuity corresponds to a value of the stream of future annuity payments under the annuity contract; and generate an output corresponding to the partial withdrawal amount or the surrender amount.

11. The system of claim 10 wherein the database is further configured to store an amount annuitized, an age of annuitant, an annuity factor, a unit value and an assumed investment return (AIR) and the computer is configured to check the database to determine the number of units that are payable in an annuity payment, the number of units paid being calculated using the equation:

$$\text{Units Paid} = (\text{Amount Annuitized}) \times \frac{\text{Annuity Factor}}{\text{Unit Value}}; \text{ and}$$

; and
   calculate the annuity payment based on the units paid.

12. The system of claim 11 wherein the computer is configured to calculate the annuity factor using the equation:

$$\frac{1}{((1-v^n)/d)}$$

where $v=1/(1+I_0)$,
   $I_0=\text{AIR}$,
   $d=I_0 v$, and
   $n=$(the predetermined age)−(the age of annuitant on the annuitization date).

13. The system of claim 10 wherein the database is configured to store an amount annuitized, an annuity factor, a unit value, an assumed investment return (AIR), and the computer is configured to check the database to determine a total number of payments for the contract determine the number of units that are payable in an annuity payment, the number of units paid being calculated using the equation:

$$\text{Units Paid} = \frac{((\text{Amount Annuitized})/\text{Total Number of Payments})}{\text{Unit Value}} \text{ and};$$

calculate the annuity payment based on the units paid.

14. The system of claim 10 wherein the database stores an annuity principal, annual payments, conditions for withdrawal, an age of annuitant, and remaining payments and said computer is configured to check the database to receive a request for a partial withdrawal of the annuity principal;

determine whether the request meets the conditions for withdrawal;

determine whether the contract was annuitized during a surrender charge period;

determine a percentage of the annual payments to be withdrawn; and calculate a present value of a percentage of the remaining payments using the equation:

$$\text{Present value} = (\text{percentage of annual payments to be withdrawn}) \times (\text{annual payment}) \times \frac{1}{((1-v^n)/d)}$$

where $v=1/(1+I_0)$,
$I_0=\text{AIR}$,
$d=I_0 v$, and
$n=(\text{predetermined age})-(\text{the age of annuitant on the annuitization date})$.

15. The system of claim 14 wherein the processor the processor provides an amount waived and a percentage (%) withdrawn; and the processor calculates a reduction in the present value using the equation:

$$\text{Reduction} = \frac{(\text{Amount waived}) \times (\% \text{ withdrawn}) \times \begin{pmatrix} \text{number of payments not yet paid} \\ \text{until a surrender charge of the contract} \\ \text{in a deferred phase would have expired} \end{pmatrix}}{\begin{pmatrix} \text{Total number of payments to be paid at time} \\ \text{of annuitization until the surrender charge of the} \\ \text{contract in the deferred phase would have expired} \end{pmatrix}}.$$

16. The system of claim 15 wherein the step of calculating the partial withdrawal amount includes subtracting the reduction from the present value.

17. The system of claim 10 further comprising:

the database stores an age of annuitant, annual payment and a surrender charge period, and said computer is configured to check the database to;

determine whether a contract owner is requesting to surrender the annuity contract;

determine whether the annuity contract was annuitized during the surrender charge period; and calculate a present value of a percentage of the remaining payments using the equation:

$$\text{Present value} = (\text{annual payment}) \times \frac{1}{((1-v^n)/d)}$$

where $v=1/(1+I_0)$,
$I_0=\text{AIR}$,
$d=I_0 v$, and
$n=(\text{predetermined age})-(\text{the age of annuitant on the annuitization date})$.

18. The system of claim 17 wherein the computer is configured to provide an amount waived and a percentage (%) withdrawn, and to calculate a reduction in the present value using the equation:

$$\text{Reduction} = \frac{(\text{Amount waived}) \times (\% \text{ withdrawn}) \times \begin{pmatrix} \text{number of payments not yet paid} \\ \text{until a surrender charge of the contract} \\ \text{in a deferred phase would have expired} \end{pmatrix}}{\begin{pmatrix} \text{Total number of payments to be paid at time} \\ \text{of annuitization until the surrender charge of the} \\ \text{contract in the deferred phase would have expired} \end{pmatrix}}.$$

19. The system of claim 18 wherein the computer is configured to calculate the surrender amount by subtracting the reduction from the present value.

20. The system of claim 10 wherein the computer is configured to generate a signal signaling production of a check for one of the partial withdrawal amount and the surrender amount.

21. A system for administering an annuity contract comprising the instructions for: a database provides store information, including an annuitization date and an assumed investment return (AIR); and a computer is configured to check the database to: determine whether the contract has annuitized based on the annuitization date; access the database to determine the payout option; determine entry into a payout phase after the annuitization date, wherein the payout option is an option where payments are made to a predetermined age; after entry into the payment phase, calculate a reserve amount based on information in the database; and calculate the value of the surrender amount of the annuity to obtain a payout of principal in its entirety, wherein the amount corresponds to the value of the stream of future annuity payments under the annuity contract; the computer is further configured to generate an output corresponding to the reserve amount and to provide an option to a user to select to surrender the annuity contract during the payment phase and to generate a surrender value to be paid to the contract owner.

22. The system of claim 21 wherein the computer is further configured to determine a payment and a number of payments remaining on the contract; and to calculate a reserve amount, wherein the reserve amount is calculated using the equation:

$$\text{Reserve} = \text{Payment} \times \frac{1}{((1-v^x)/d)}$$

where $v=1/(1+I_0)$,
$I_0=\text{AIR}$,
$d=I_0 v$, and
$x=\text{number of payments remaining on the contract}$.

23. The system of claim 21 wherein the computer is further configured to discount the reserve at an interest rate equal to the AIR.

24. The system of claim 23 wherein the computer is further configured to generate a signal signaling production of a check for the reserve amount.

25. A method of administering an annuity contract comprising: providing a database to store information related to the annuity contract, the information including a payout option and an annuitization date; determining whether the contract has annuitized based on the annuitization date; accessing the database to determine the payout option; calculating the value of the annuity to correspond to a value of the stream of future annuity payments under the annuity contract; calculating an annuity payment based on the payout option; determining entry into a payout phase after the annuitization date, wherein the payout option is an option where payments are made to a predetermined age; after entry into the payment phase, calculating one of a partial withdrawal amount and a surrender amount for obtaining a payout of principal in its entirety based on information in the database, wherein a processor receives a request for a withdrawal amount during the payment phase and applies the withdrawal amount to information associated with an individual annuity and further generates an output to permit the withdrawal when scheduled payments under the payment phase are not reduced below a threshold amount; and generating an output corresponding to the partial withdrawal amount or the surrender amount.

26. The method of claim 25 further comprising storing an amount annuitized, an age of annuitant, an annuity factor, a unit value and an assumed investment return (AIR) in the database;

determining the number of units that are payable in an annuity payment, the number of units paid being calculated using the equation:

$$\text{Units Paid} = (\text{Amount Annuitized}) \times \frac{\text{Annuity Factor}}{\text{Unit Value}}; \text{ and}$$

calculating the annuity payment based on the units paid.

27. The method of claim 26 further comprising calculating the annuity factor using the equation:

$$\frac{1}{((1-v^n)/d)}$$

where $v=1/(1+I_0)$,
$I_0=\text{AIR}$,
$d=I_0 v$, and
$n=$(the predetermined age)$-$(the age of annuitant on the annuitization date).

28. The method of claim 25 further comprising storing an amount annuitized, an annuity factor, a unit value, an assumed investment return (AIR) in the database;

determining a total number of payments for the contract;

determining the number of units that are payable in an annuity payment, the number of units paid being calculated using the equation:

$$\text{Units Paid} = \frac{((\text{Amount Annuitized})/\text{Total Number of Payments})}{\text{Unit Value}} \text{ and;}$$

calculating the annuity payment based on the units paid.

29. The method of claim 25 further comprising;

storing an annuity principal, annual payments, conditions for withdrawal, an age of annuitant, and remaining payments in the database;

receiving a request for a partial withdrawal of the annuity principal;

determining whether the request meets the conditions for withdrawal;

determining whether the contract was annuitized during a surrender charge period;

determining a percentage of the annual payments to be withdrawn; and calculating a present value of a percentage of the remaining payments using the equation:

$$\text{Present value} = (\text{percentage of annual payments to be withdrawn}) \times (\text{annual payment}) \times \frac{1}{((1-v^n)/d)}$$

where $v=1/(1+I_0)$,
$I_0=\text{AIR}$,
$d=I_0 V$, and
$n=$(predetermined age)$-$(the age of annuitant on the annuitization date).

30. The method of claim 29 further comprising:

providing an amount waived and a percentage (%) withdrawn; and calculating a reduction in the present value using the equation:

$$\text{Reduction} = \frac{(\text{Amount waived}) \times (\% \text{ withdrawn}) \times \begin{pmatrix} \text{number of payments not yet paid} \\ \text{until a surrender charge of the contract} \\ \text{in a deferred phase would have expired} \end{pmatrix}}{\begin{pmatrix} \text{Total number of payments to be paid at time} \\ \text{of annuitization until the surrender charge of the} \\ \text{contract in the deferred phase would have expired} \end{pmatrix}}.$$

31. The method of claim 30 wherein the step of calculating the partial withdrawal amount includes subtracting the reduction from the present value.

32. The method of claim 25 further comprising:

storing an age of annuitant, annual payment and a surrender charge period in the database;

determining whether a contract owner is requesting to surrender the annuity contract;

determining whether the annuity contract was annuitized during the surrender charge period; and calculating a present value of a percentage of the remaining payments using the equation:

$$\text{Present value} = (\text{annual payment}) \times \frac{1}{((1-v^n)/d)}$$

where $v=1/(1+I_0)$,
$I_0=\text{AIR}$,
$d=I_0 v$, and
$n=$(predetermined age)$-$(the age of annuitant on the annuitization date).

33. The method of claim 32 further comprising:

providing an amount waived and a percentage (%) withdrawn; and calculating a reduction in the present value using the equation:

$$\text{Reduction} = \frac{(\text{Amount waived}) \times (\% \text{ withdrawn}) \times \begin{pmatrix} \text{number of payments not yet paid} \\ \text{until a surrender charge of the contract} \\ \text{in a deferred phase would have expired} \end{pmatrix}}{\begin{pmatrix} \text{Total number of payments to be paid at time} \\ \text{of annuitization until the surrender charge of the} \\ \text{contract in the deferred phase would have expired} \end{pmatrix}}.$$

34. The method of claim 33 wherein the step of calculating the surrender amount includes subtracting the reduction from the present value.

35. The method of claim 25 further comprising signaling production of a check for one of the partial withdrawal amount and the surrender amount.

36. A method of administering an annuity contract comprising: providing a database to store information, including an annuitization date and an assumed investment return (AIR); determining whether the contract has annuitized based on the annuitization date; accessing the database to determine the payout option; determining the value of the annuity to correspond to the value of the stream of future annuity payments under the annuity contract; determining entry into a payout phase after the annuitization date, wherein the payout option is an option where payments are made to a predetermined age; after entry into the payment phase, calculating a reserve amount based on information in the database including one or more separate withdrawals made during the payout phase that are processed and issued when the post-withdrawal payments under the payout phase are above a pre-set minimum; generating an output corresponding to the reserve amount; and providing an option to a user to interact with a processor to select to surrender the annuity for obtaining a payout of principal in its entirety during the payment phase.

37. The method of claim 36 further comprising:
determining a payment and a number of payments remaining on the contract; and
calculating a reserve amount, wherein the reserve amount is calculated using the equation:

$$\text{Reserve} = \text{Payment} \times \frac{1}{((1 - v^x)/d)}$$

where $v = 1/(1+I_0)$,
$I_0 = \text{AIR}$,
$d = I_0 v$, and
$x$ = number of payments remaining on the contract.

38. The method of claim 37 further comprising discounting the reserve at an interest rate equal to the AIR.

39. The method of claim 36 further comprising signaling production of a check for the reserve amount.

\* \* \* \* \*